US008151576B2

(12) United States Patent
Kim et al.

(10) Patent No.: US 8,151,576 B2
(45) Date of Patent: Apr. 10, 2012

(54) REFRIGERATOR AND METHOD OF OPERATING A REFRIGERATOR

(75) Inventors: Su-Cheong Kim, Busan (KR); Jong-Min Shin, Busan (KR); Su-Won Lee, Changwon (KR); Cheol-Hwan Kim, Gimhae (KR); Yong-Chol Kwon, Changwon (KR); Ku-Young Son, Busan (KR)

(73) Assignee: LG Electronics Inc., Seoul (KR)

( * ) Notice: Subject to any disclaimer, the term of this patent is extended or adjusted under 35 U.S.C. 154(b) by 753 days.

(21) Appl. No.: 12/279,522

(22) PCT Filed: Sep. 27, 2006

(86) PCT No.: PCT/KR2006/003850
§ 371 (c)(1),
(2), (4) Date: Jan. 16, 2009

(87) PCT Pub. No.: WO2007/094540
PCT Pub. Date: Aug. 23, 2007

(65) Prior Publication Data
US 2009/0126393 A1 May 21, 2009

(30) Foreign Application Priority Data

Feb. 15, 2006 (KR) .................. 10-2006-0014692
Jul. 1, 2006 (KR) .................. 10-2006-0061685
Jul. 1, 2006 (KR) .................. 10-2006-0061686
Jul. 1, 2006 (KR) .................. 10-2006-0061692

(51) Int. Cl.
F25C 1/00 (2006.01)

(52) U.S. Cl. ............................... 62/66; 62/389

(58) Field of Classification Search ................. 62/389, 62/314, 66, 340, 407, 441, 449
See application file for complete search history.

(56) References Cited

U.S. PATENT DOCUMENTS

| 4,483,823 | A * | 11/1984 | Umetsu et al. ............. 422/63 |
| 6,226,994 | B1 * | 5/2001 | Yamada et al. ............. 62/3.7 |
| 6,451,364 | B1 | 9/2002 | Ito |
| 6,637,226 | B2 * | 10/2003 | Watanabe et al. ........... 62/201 |
| 7,243,909 | B2 * | 7/2007 | Koplin ........................ 261/29 |
| 2001/0003347 | A1 * | 6/2001 | Shimoda et al. ............ 236/13 |
| 2003/0061821 | A1 * | 4/2003 | Satoh ............................ 62/69 |
| 2003/0068414 | A1 | 4/2003 | Ito |
| 2003/0090915 | A1 * | 5/2003 | Nakamura et al. ........... 363/37 |
| 2004/0007458 | A1 * | 1/2004 | Fujita ......................... 204/252 |
| 2005/0028550 | A1 * | 2/2005 | Crettet ........................ 62/391 |
| 2005/0072852 | A1 | 4/2005 | An et al. |
| 2005/0284167 | A1 * | 12/2005 | Morgan et al. .............. 62/272 |

(Continued)

FOREIGN PATENT DOCUMENTS

JP 59-151834 A 8/1984
(Continued)

*Primary Examiner* — Mohammad Ali
(74) *Attorney, Agent, or Firm* — Birch, Stewart, Kolasch & Birch, LLP

(57) ABSTRACT

The present invention discloses a refrigerator including a liquid, cool air supplied to supercool the liquid, and a preventing means for preventing the liquid from existing as a solid phase, and a method of operating the refrigerator. The preventing means is at least one of an energy generator for supplying energy to the liquid supplied with the cool air to maintain the liquid in the supercooled state, a restricting member for interrupting the motion of the liquid, and a heater for converting the liquid converted into a solid phase into the liquid.

24 Claims, 14 Drawing Sheets

U.S. PATENT DOCUMENTS

| | | | |
|---|---|---|---|
| 2006/0053558 A1* | 3/2006 | Ye | 5/689 |
| 2006/0096310 A1* | 5/2006 | Lee | 62/348 |
| 2006/0144066 A1* | 7/2006 | Lee et al. | 62/238.6 |

FOREIGN PATENT DOCUMENTS

| | | |
|---|---|---|
| JP | 3207975 A | 9/1991 |
| JP | 2001-086967 A | 4/2001 |
| JP | 2002-022333 A | 1/2002 |
| JP | 2002/364968 A | 12/2002 |
| JP | 2003-88347 A | 3/2003 |
| KR | 1996-0034941 A | 10/1996 |
| KR | 10-2001-0107286 | 12/2001 |
| KR | 10-2003-0031764 A | 4/2003 |
| KR | 2003-0050929 A | 6/2003 |
| KR | 10-2005-0051972 A | 6/2005 |
| KR | 10-2005-0051977 A | 6/2005 |
| KR | 10-2005-0087538 A | 8/2005 |
| KR | 20-0393464 A | 8/2005 |
| KR | 10-2005-0106553 A | 11/2005 |
| WO | WO-98/41115 | 9/1998 |
| WO | WO-2005/052477 A1 | 6/2005 |
| WO | WO-2006/004116 A1 | 1/2006 |

* cited by examiner

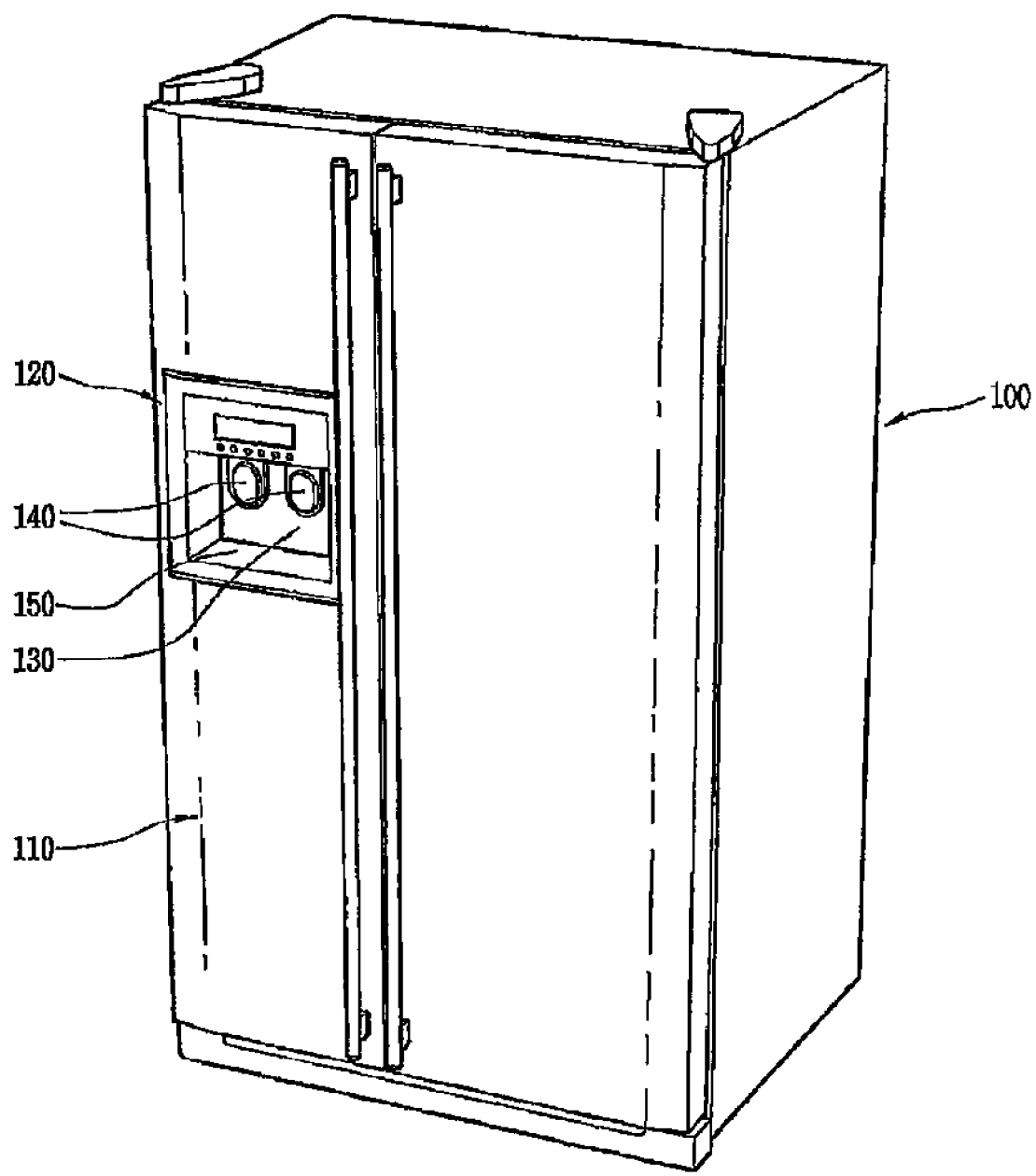
[Fig. 1]

[Fig. 2]
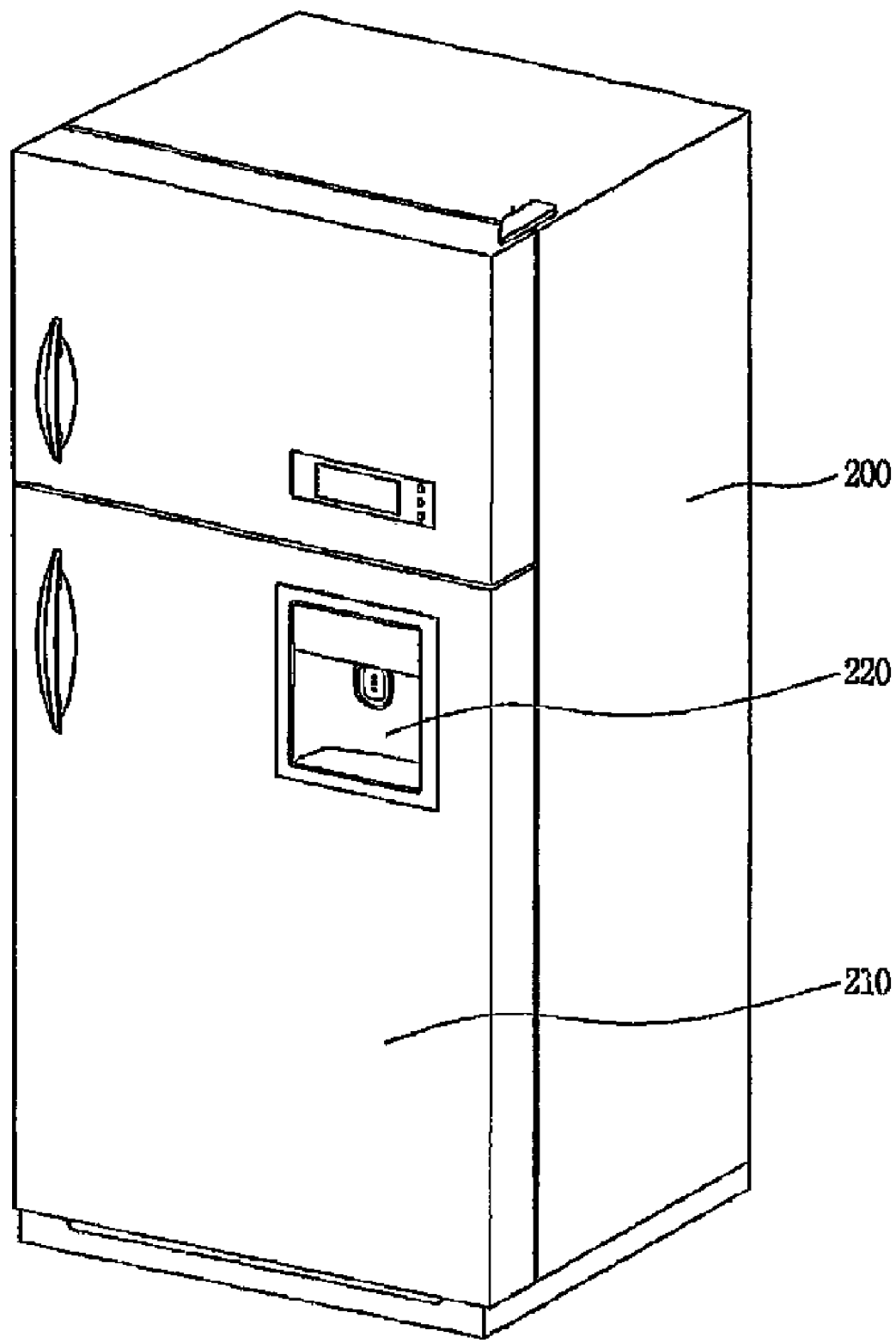

[Fig. 3]
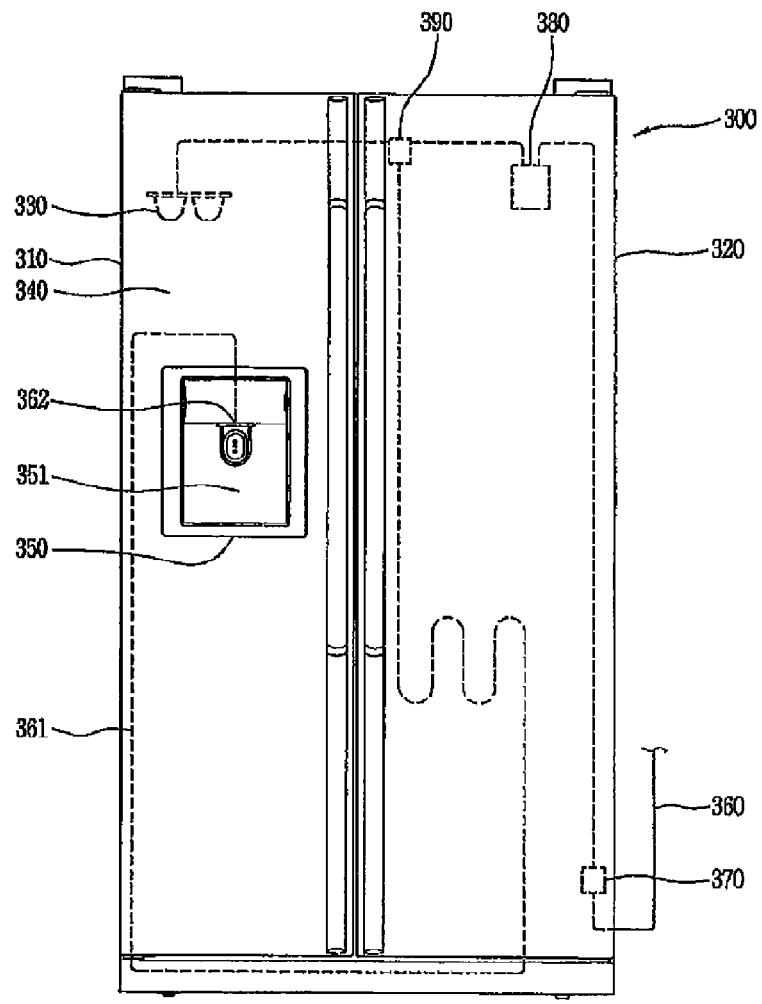
[Fig. 4]
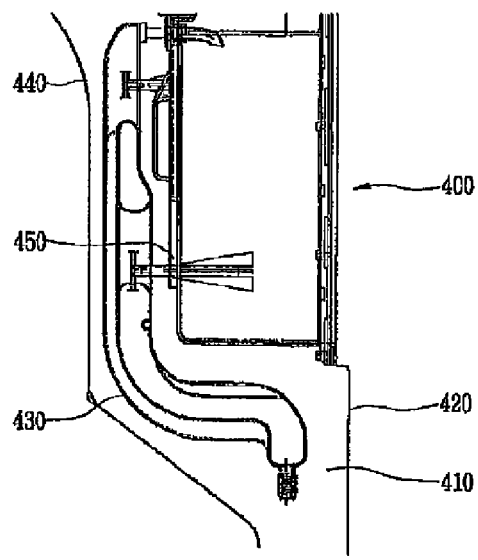

[Fig. 5]
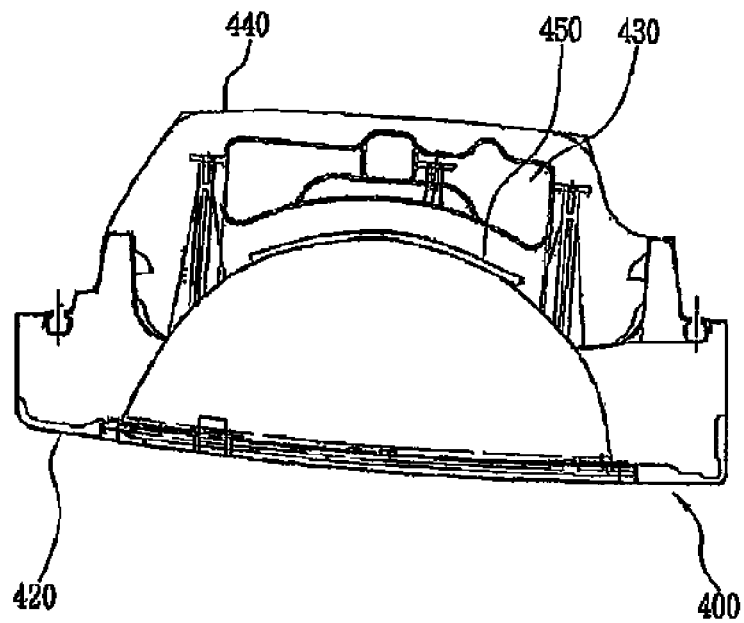
[Fig. 6]
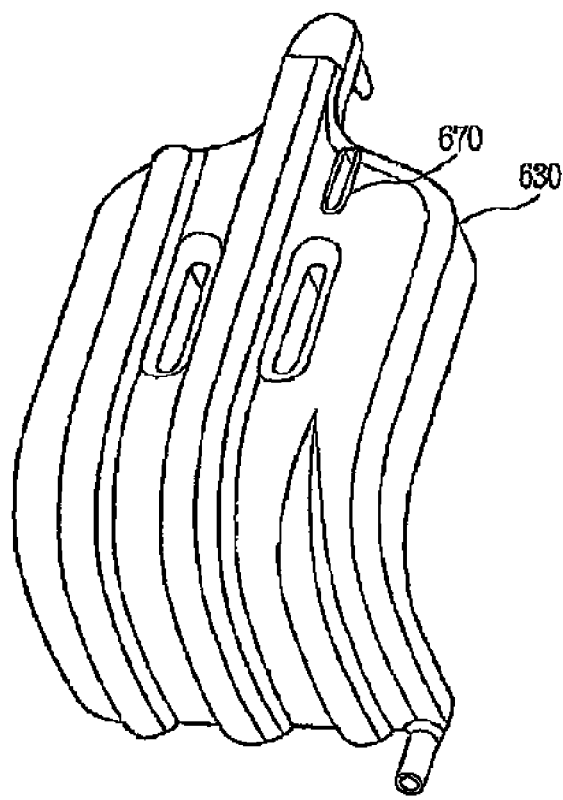

[Fig. 7]
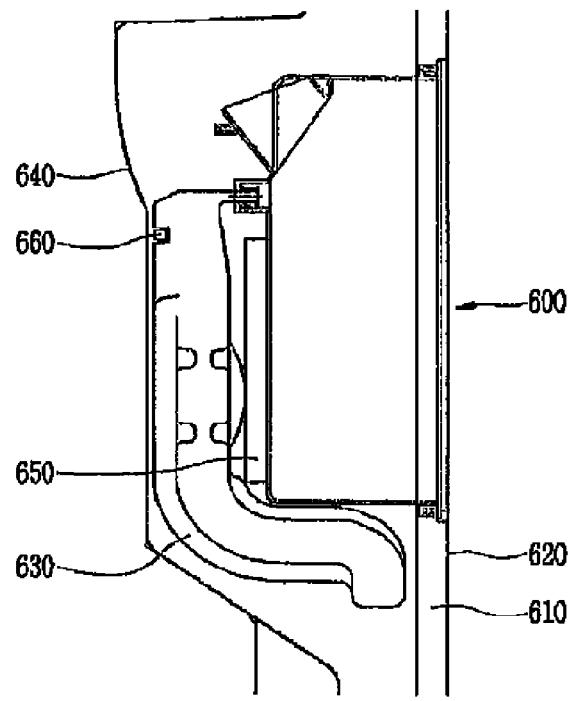
[Fig. 8]
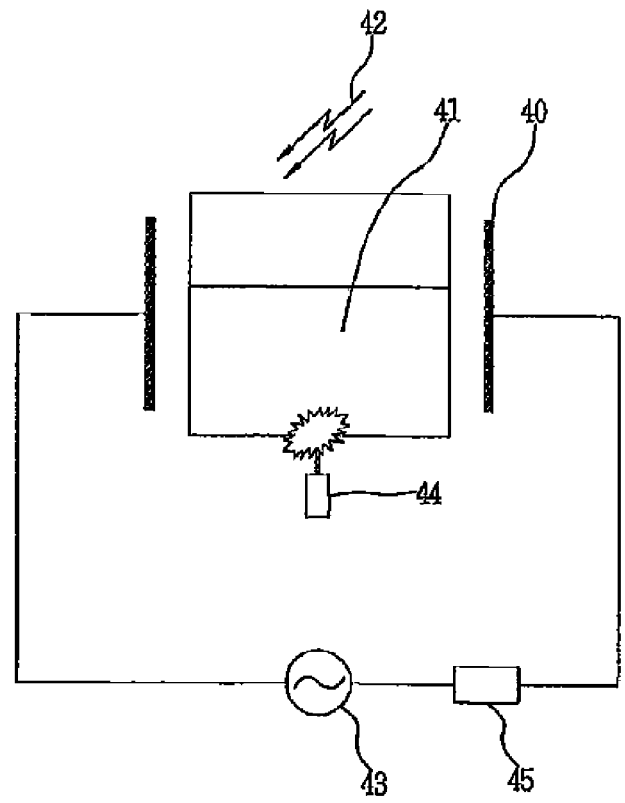

[Fig. 9]
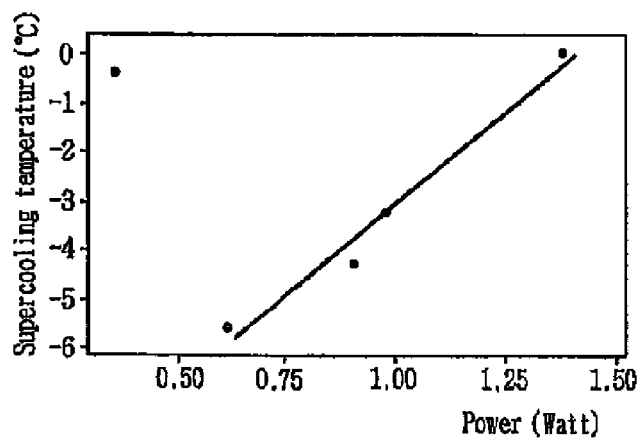
[Fig. 10]
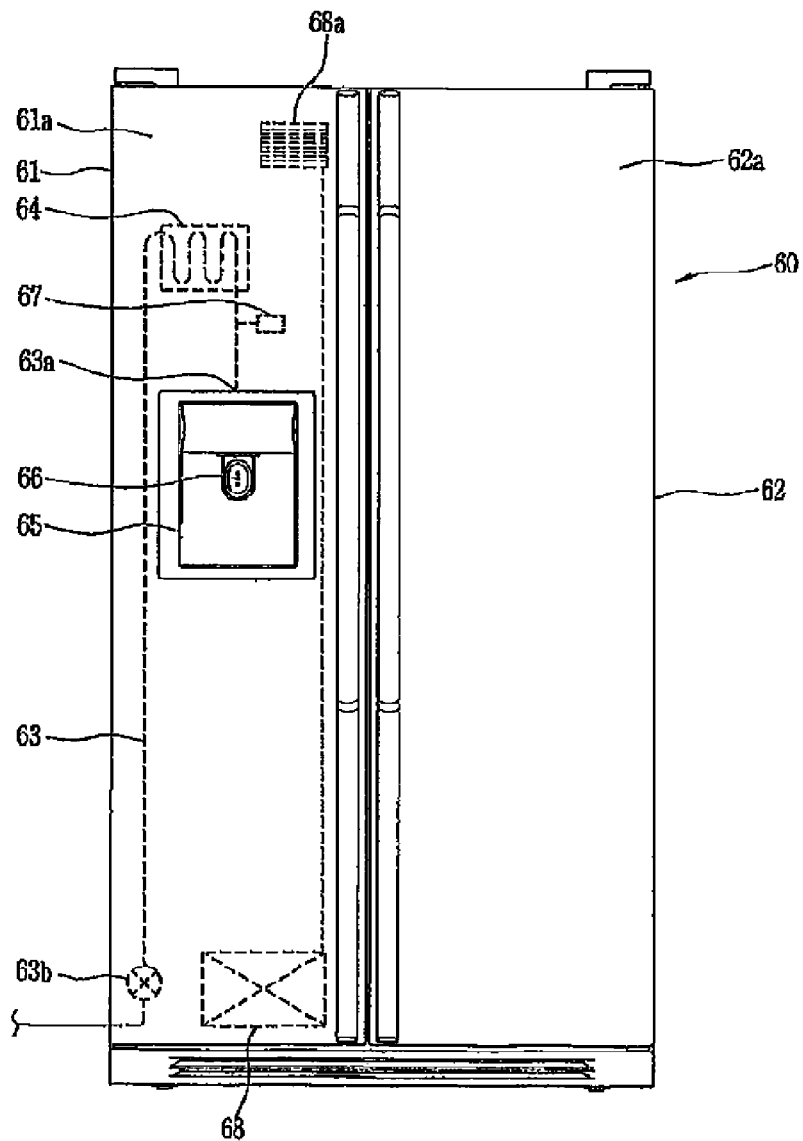

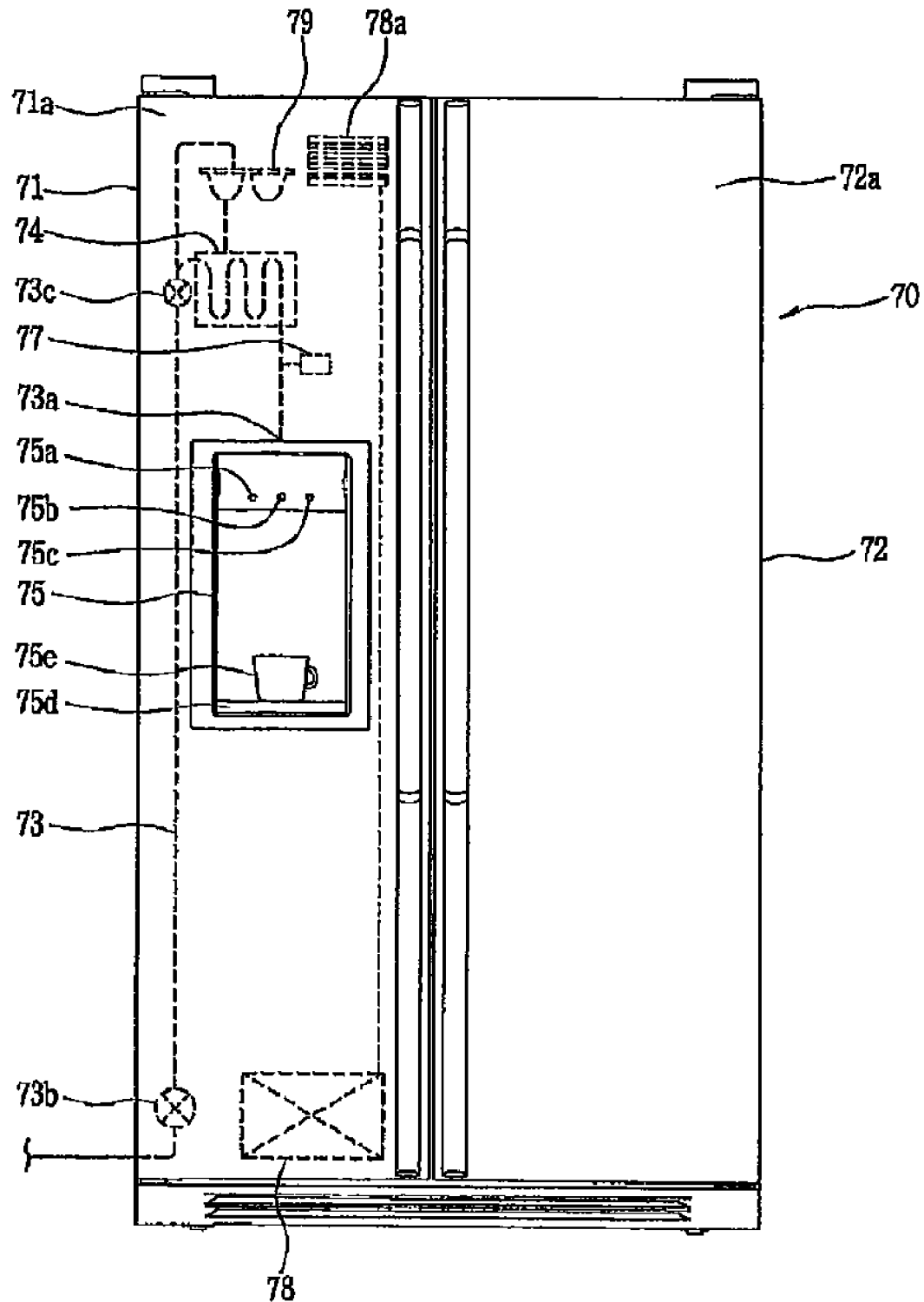
[Fig. 11]

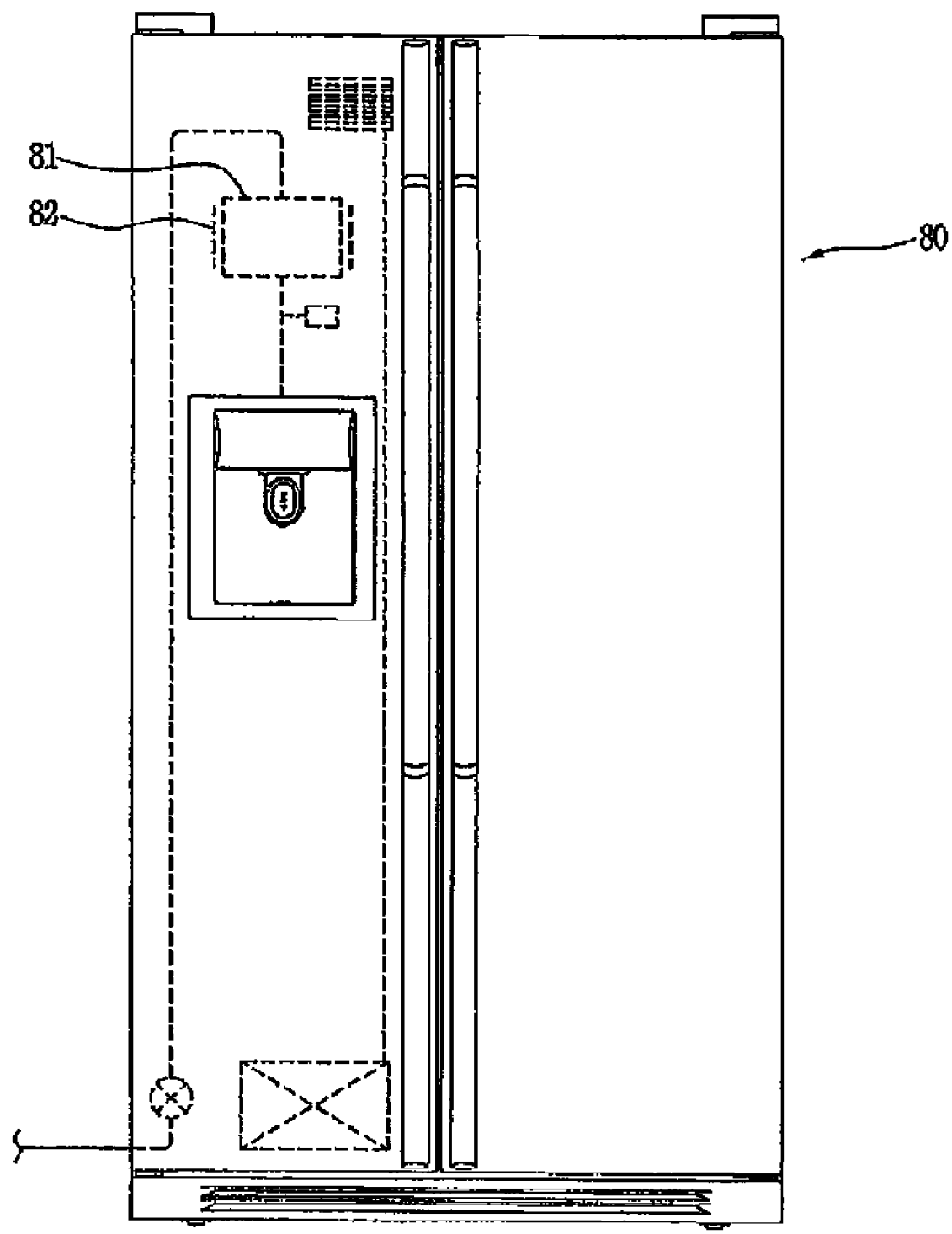
[Fig. 12]

[Fig. 13]
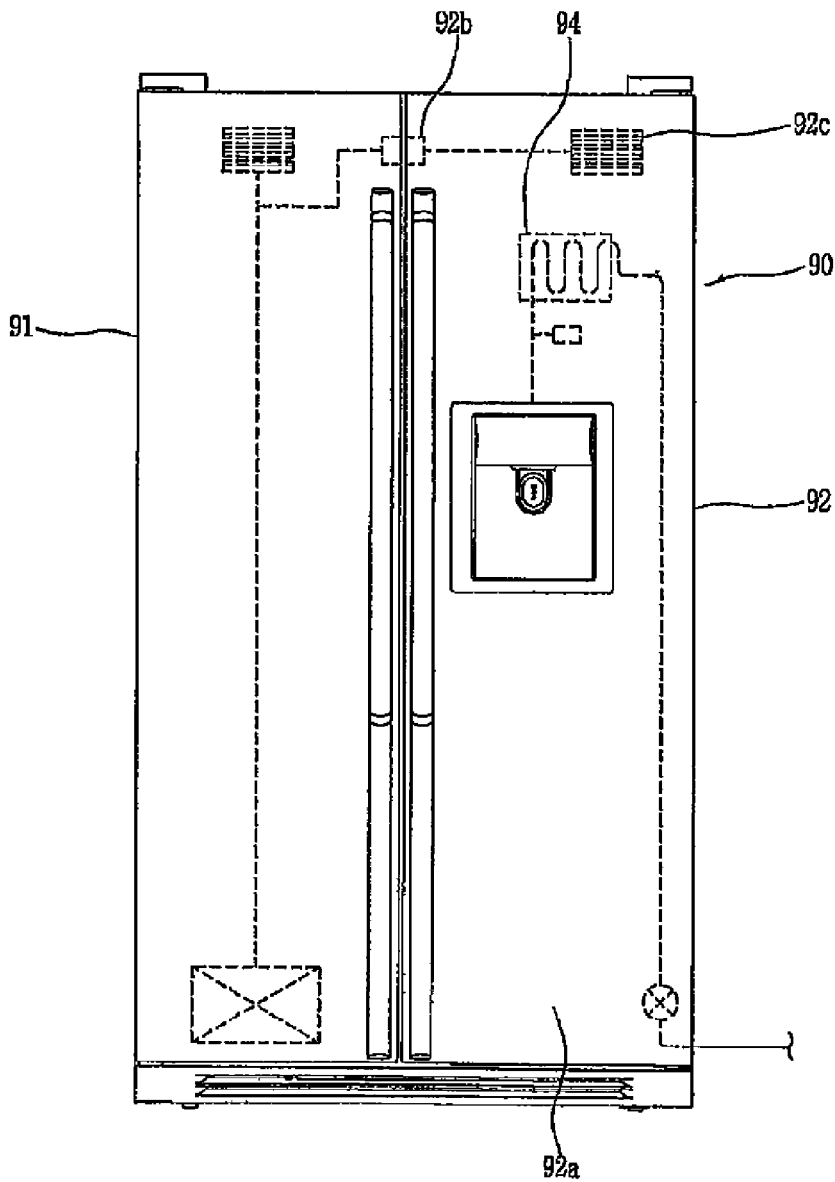
[Fig. 14]
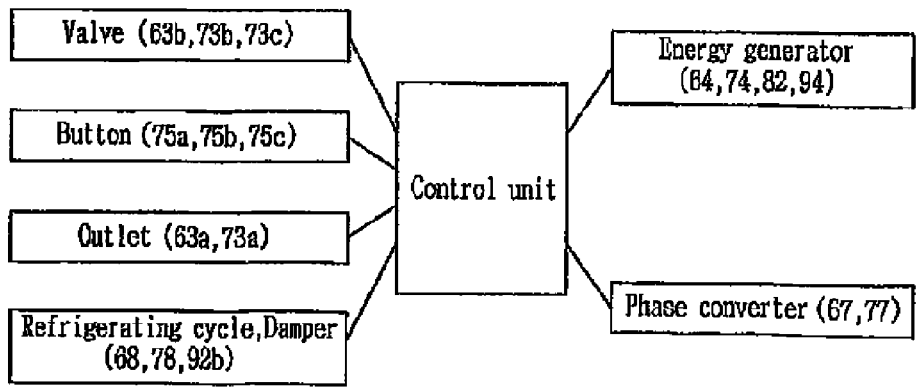

[Fig. 15]
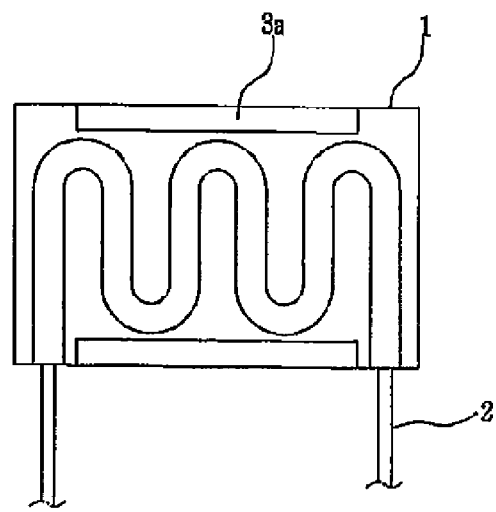
[Fig. 16]
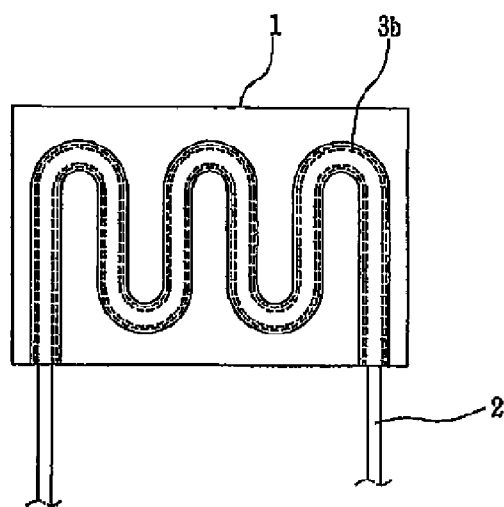
[Fig. 17]
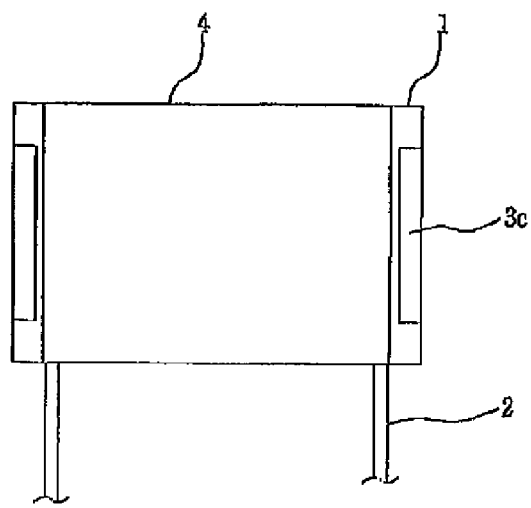

[Fig. 18]
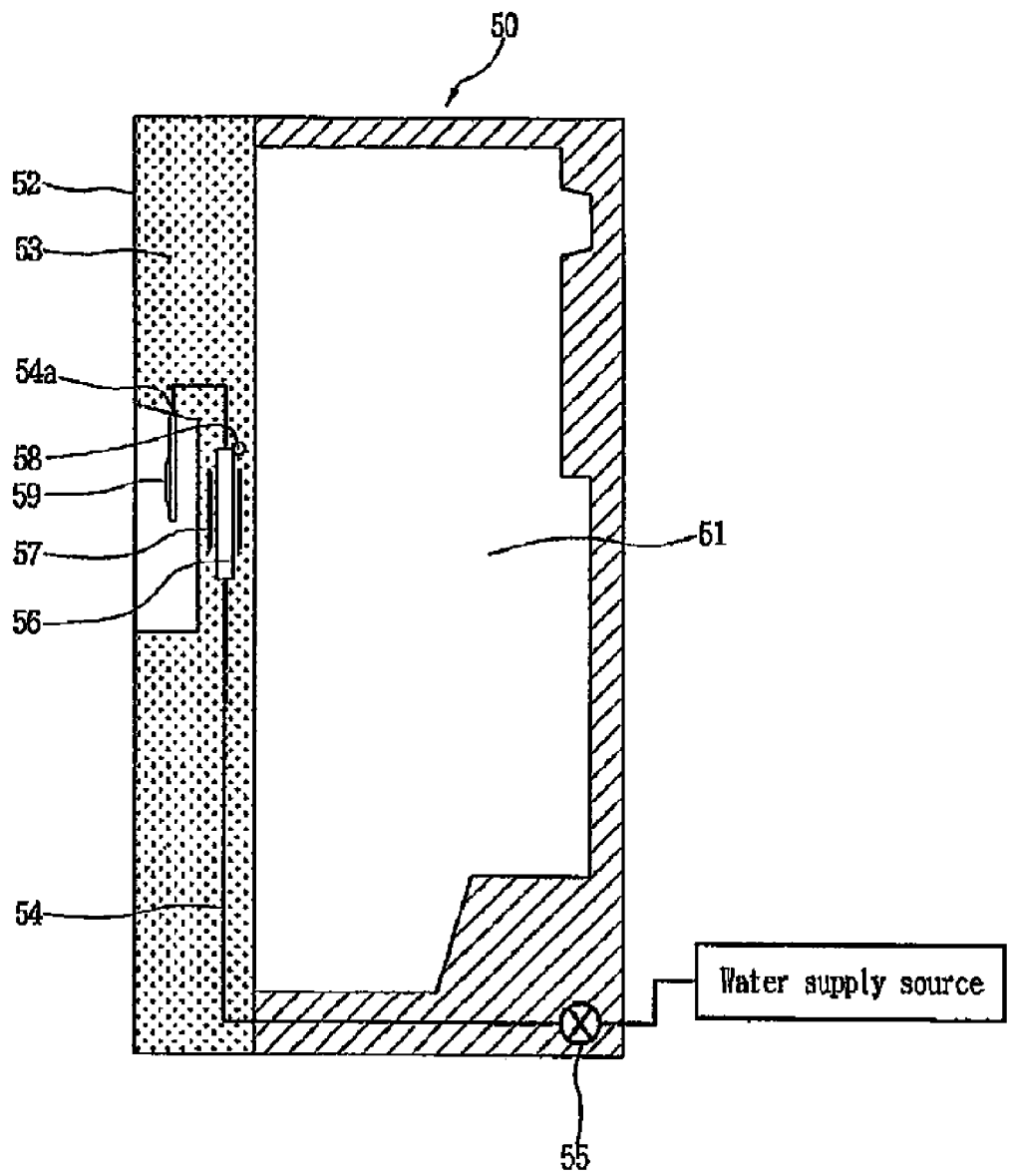
[Fig. 19]
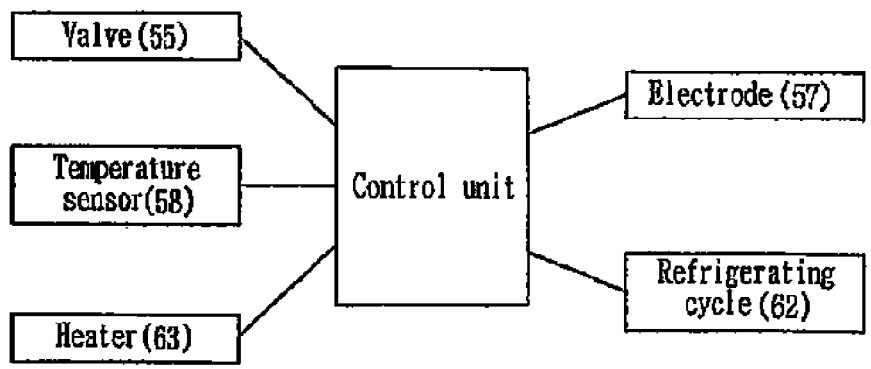

[Fig. 20]
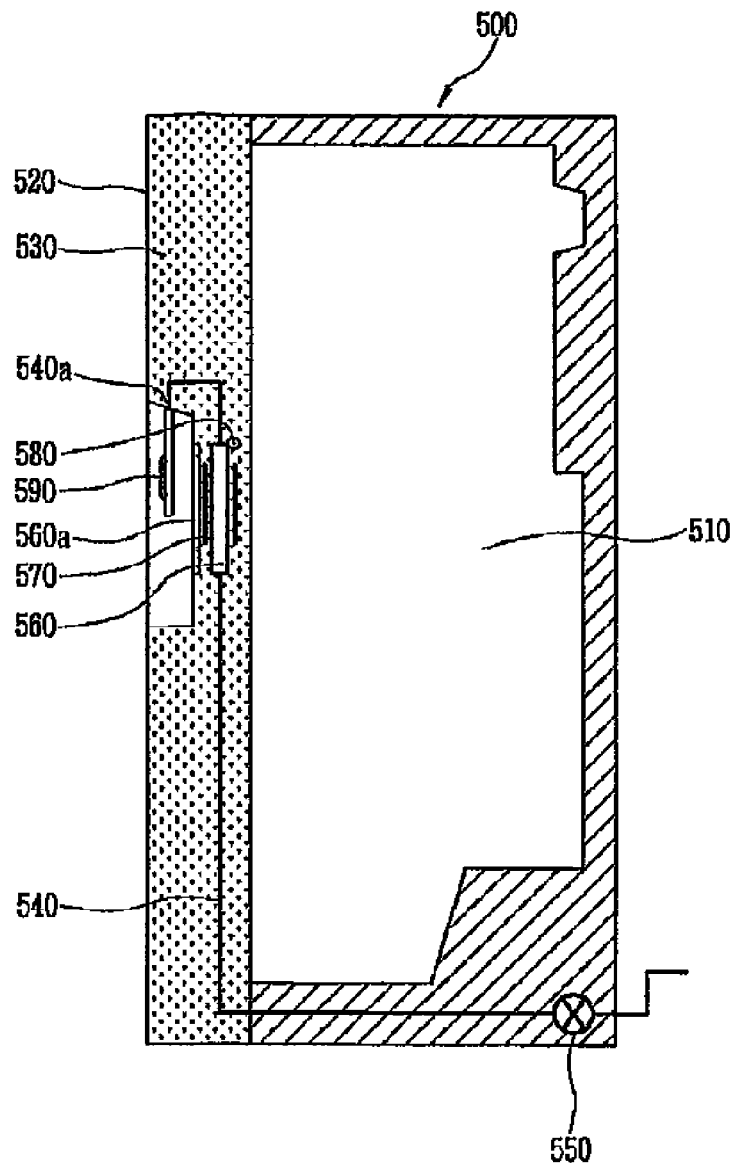
[Fig. 21]
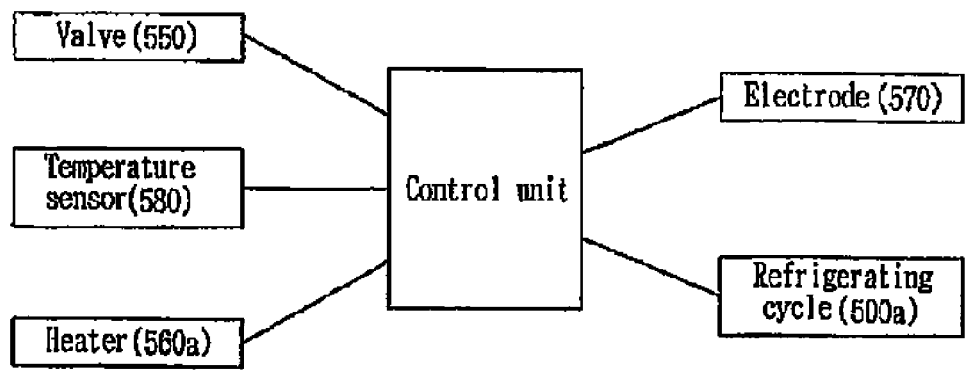

[Fig. 22]
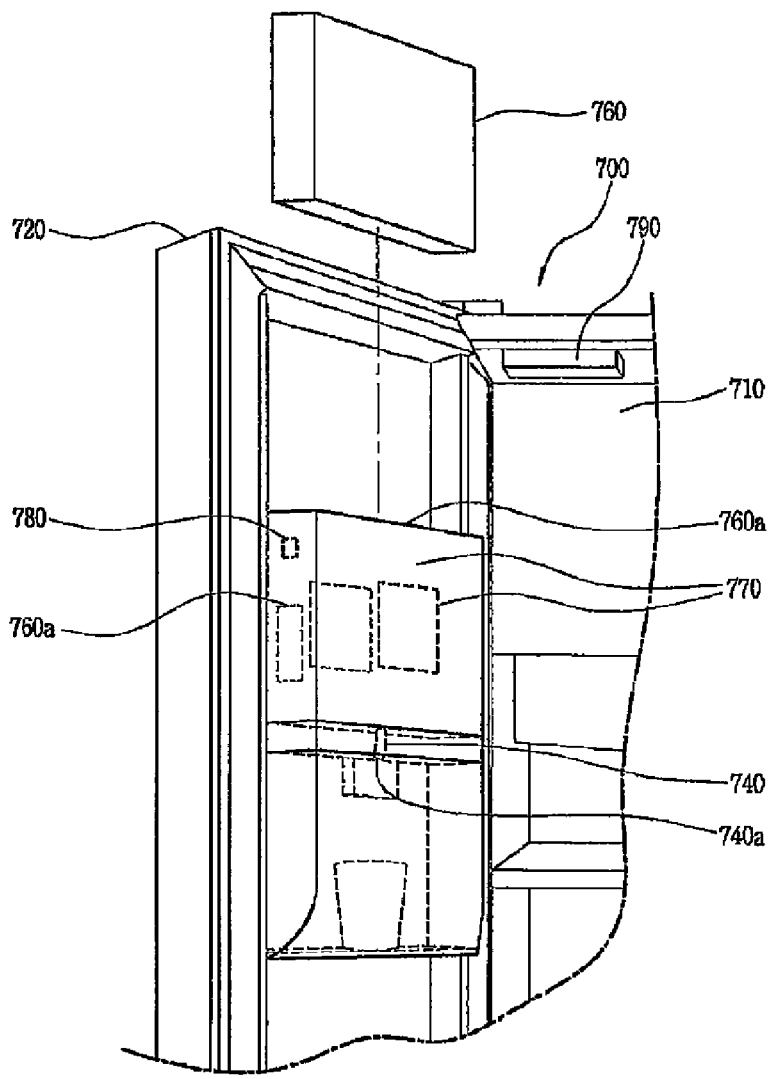
[Fig. 23]
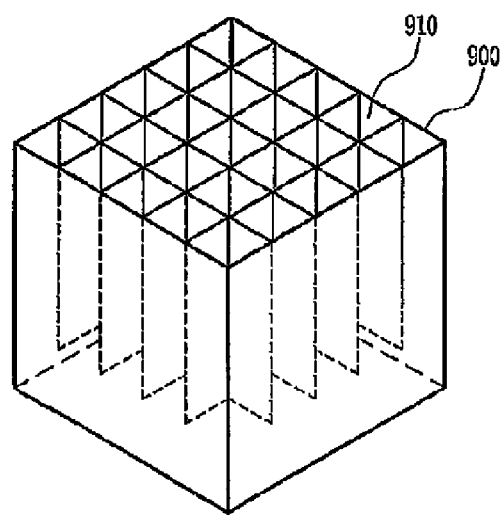

[Fig. 24]
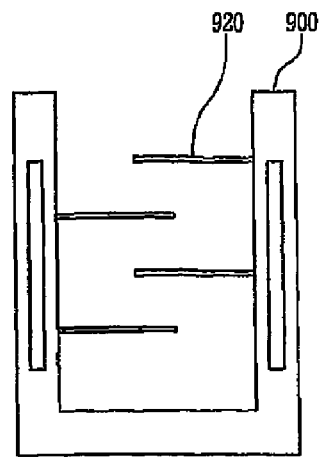
[Fig. 25]
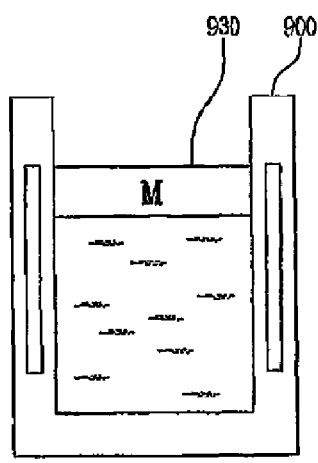
[Fig. 26]
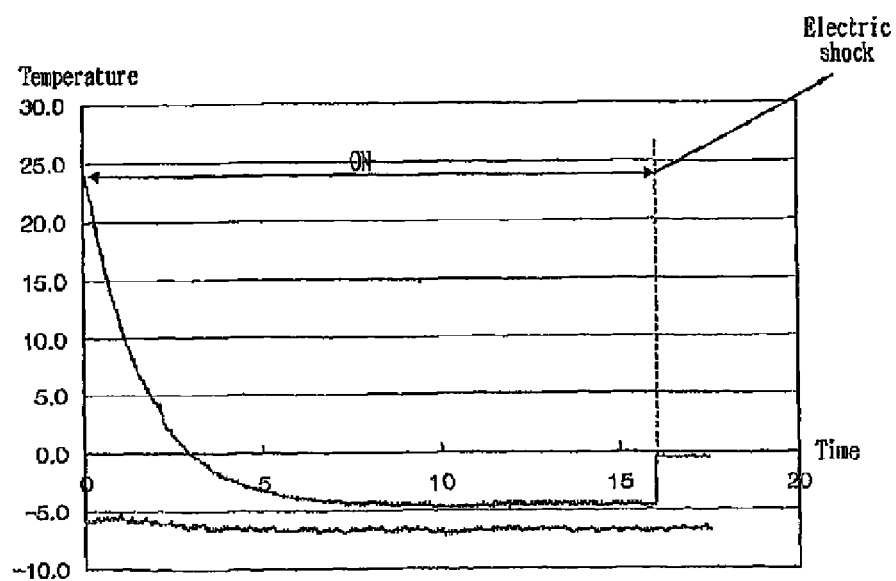

REFRIGERATOR AND METHOD OF OPERATING A REFRIGERATOR

TECHNICAL FIELD

The present invention relates to a refrigerator and a method of operating a refrigerator, and more particularly, to a refrigerator with cool water supply means such as a dispenser, and a method of operating the refrigerator which can prevent freezing of a liquid such as water, generate a supercooled liquid, prevent and restrict freezing of the supercooled liquid, and release freezing.

BACKGROUND ART

Supercooling means that a liquid such as water is not transited to a solid but maintained in a high temperature phase, namely, a liquid phase even below a phase transition temperature to the solid. Water drops can be supercooled in the natural state. In addition, water or beverages may be incidentally supercooled in a general refrigerator. A freezing method disclosed under Japan Laid-Open Patent Official Gazette S59-151834 and a freezing method and a refrigerator disclosed under Japan Laid-Open Patent Official Gazette 2001-086967 apply the supercooling principle to the refrigerator. An electric field or a magnetic field is applied to foods of the refrigerator, so that the foods can be maintained in a supercooled state below a phase transition temperature. An electrostatic field processing method disclosed under International Publication Official Gazette WO/98/41115 suggests various types of electrode structures that can be used to supercool and thaw foods.

FIG. 1 is a structure view illustrating a refrigerator including a dispenser disclosed under Korea Laid-Open Patent Official Gazette 2001-0107286. The refrigerator 100 includes the dispenser 120 on a freezing chamber door 110. The dispenser 120 has operation levers 140 and a support 150 on an outlet unit 130.

FIG. 2 is a structure view illustrating a refrigerator including a dispenser disclosed under Korea Laid-Open Patent Official Gazette 2003-0050929. The refrigerator 200 includes the dispenser 220 on a refrigerating chamber door 210.

FIG. 3 is a structure view illustrating another example of the refrigerator including the dispenser. The refrigerator 300 includes a freezing chamber 310 and a refrigerating chamber 320. An ice maker 330 is installed in the freezing chamber 310, and the dispenser 350 is installed on the freezing chamber door 340. A passage 360 is formed to supply water to the ice maker 330 and the dispenser 350, and connected to an external water supply source (not shown). A first valve 370, a filter 380 and a second valve 390 are disposed on the passage 360. The first valve 370 controls water supply from the external water supply source to the refrigerator 300, the filter 380 filters water, and the second valve 390 controls water supply to the ice maker 330 and the dispenser 350. On the other hand, the first valve 370 and the second vale 390 are controlled by a control unit (not shown) of the refrigerator 300. The passage 360 includes a passage 361 for supplying water to the dispenser 350. Water flowing through the passage 361 is cooled by heat exchange with the freezing chamber 310, and discharged through an outlet 362 of the passage 361 or an outlet 351 of the dispenser 350.

FIGS. 4 and 5 are structure views illustrating a dispenser of a refrigerator disclosed under Korea Laid-Open Patent Official Gazette 2005-0051977. The dispenser 400 is installed on a freezing chamber door filled with an insulator 410, and includes a water tank 430. The water tank 430 cools water by exchanging heat with a freezing chamber side 440. The insulator 410 is filled between the water tank 430 and the freezing chamber side 440 for heat exchange. On the other hand, the dispenser 400 includes a heater 450 at the opposite side to the freezing chamber side 440 on the basis of the water tank 430. The heater 450 is used to control a temperature of water in the water tank 430.

FIGS. 6 and 7 are structure views illustrating a dispenser of a refrigerator disclosed under Korea Laid-Open Patent Official Gazette 2005-0051972. The dispenser 600 is installed on a freezing chamber door 620 filled with an insulator 610, and includes a water tank 630. The water tank 630 cools water by exchanging heat with a freezing chamber side 640. In addition, the dispenser 600 includes a heater 650 at the opposite side to the freezing chamber side 640 on the basis of the water tank 630. The heater 650 is used to control a temperature of water in the water tank 630, or melt the water frozen due to long time non-use of the dispenser 600. On the other hand, the dispenser 600 includes a temperature sensor 660 for such an operation. The water tank 630 includes a groove 670 on which the temperature sensor 660 can be mounted.

However, the conventional apparatus for cooling does not provide an apparatus for making a supercooled liquid, an apparatus for making slush from a supercooled liquid, an apparatus for preventing supercooling release of a stored supercooled liquid, and an apparatus for restoring supercooling release.

In addition, in the dispenser of the conventional refrigerator, the heater is used to prevent freezing of water. If water is frozen, the frozen state is released by the heater. As a result, the temperature of water increases in the refrigerator serving to lower the temperature.

DISCLOSURE OF INVENTION

Technical Problem

An object of the present invention is to provide a refrigerator and a method of operating a refrigerator which can generate a supercooled liquid, prevent and restrict freezing of a liquid or supercooled liquid, and release freezing of the supercooled liquid.

Another object of the present invention is to provide a refrigerator and a method of operating a refrigerator which can prevent freezing of water in a dispenser without using a heater.

Yet another object of the present invention is to provide a refrigerator and a method of operating a refrigerator which can prevent freezing of water in a dispenser by lowering a phase transition temperature if water.

Yet another object of the present invention is to provide a refrigerator and a method of operating a refrigerator which can restore supercooling release of a supercooled liquid.

Yet another object of the present invention is to provide a refrigerator and a method of operating a refrigerator which can sense and restore supercooling release of a supercooled liquid.

Yet another object of the present invention is to provide a refrigerator and a method of operating the refrigerator which can prevent supercooling release of a supercooled liquid.

Yet another object of the present invention is to provide a refrigerator and a method of operating a refrigerator which can prevent supercooling release of a supercooled liquid by restricting the motion of the supercooled liquid.

Yet another object of the present invention is to provide a refrigerator and a method of operating a refrigerator which can generate a supercooled liquid and make slush from the supercooled liquid.

Yet another object of the present invention is to provide a refrigerator and a method of operating a refrigerator which can make a supercooled liquid or slush by using a supercooling release restoring means or a supercooling release preventing means.

Technical Solution

In order to achieve the above-described objects of the inventions, there is provided a refrigerator, including: a liquid; cool air supplied to supercool the liquid; and a preventing means for preventing the liquid from existing as a solid phase. Here, the meaning of to supercool the liquid includes supercooling the liquid and/or maintaining the supercooled state of the liquid. It means that the supercooled liquid can be made by a different apparatus or in another part of the refrigerator.

In another aspect of the present invention, the preventing means is at least one of an energy generator for supplying energy to the liquid supplied with the cool air to maintain the liquid in the supercooled state, a restricting member for interrupting the motion of the liquid, and a heater for converting the liquid converted into a solid phase into the liquid. This configuration serves to generate the supercooled liquid, prevent and restrict freezing of the liquid or the supercooled liquid, and release freezing of the supercooled liquid.

In another aspect of the present invention, the refrigerator further includes an energy generator for supplying energy to the liquid to supercool the liquid with the cool air and maintain the liquid in the supercooled state. Preferably, the energy generator is composed of an electrode for supplying electric energy.

In another aspect of the present invention, the preventing means is at least one of a heater for applying heat to the liquid, and a restricting means for interrupting the motion of the liquid.

In another aspect of the present invention, the refrigerator further includes a sensor for sensing a state variation of the liquid and cooperating with the heater.

In another aspect of the present invention, the refrigerator further includes a door having an outlet of the liquid. By this configuration, the present invention can be applied to a door of a general refrigerator, especially, a door of a refrigerator including a dispenser.

According to another aspect of the present invention, there is provided a refrigerator, including: a storing chamber for supplying cool air; a door for opening and closing the storing chamber; a passage being disposed at the door and having an outlet for discharging water, a temperature of water in the passage being lowered by the cool air of the storing chamber; and an energy generator disposed on the passage, for supplying energy to supercool water. As described above, supercooling means lowering of a phase transition temperature. The phase transition temperature of water is lowered by energy supply, thereby preventing freezing. Energy is supplied to lower the phase transition temperature of water. Preferably, energy is supplied in the form of an electric field for easy application. In addition, energy can be supplied in the form of a magnetic field or ultrasonic waves.

In another aspect of the present invention, the energy generator includes an electrode for forming an electric field.

In another aspect of the present invention, the refrigerator includes a water tank disposed on the passage, and the energy generator supplies energy to the water tank.

In another aspect of the present invention, the energy generator has a shape to cover a part of the passage.

In another aspect of the present invention, the passage is covered with an insulator inside the door.

In another aspect of the present invention, the storing chamber is a freezing chamber.

In another aspect of the present invention, the opposite side to the outlet of the passage is connected to an external water supply source, and, on the passage, water is supplied from the lower portion of the energy generator and discharged through the outlet disposed at the upper portion of the energy generator. By this configuration, water can be discharged from the dispenser to the outlet by pressure of the external water supply source.

According to yet another aspect of the present invention, there is provided a refrigerator, including: a storing chamber for supplying cool air; a door for opening and closing the storing chamber; a storing tank disposed at the door side for storing a supercooled liquid; a sensor for sensing a state variation of the supercooled liquid; and a heater for supplying heat to the storing tank and cooperating with the sensor. By this configuration, release of the supercooled state is sensed by the sensor and restored by the heater. For example, a temperature sensor can be used. If the temperature sensor senses that a temperature of the supercooled liquid becomes a phase transition temperature (for example, 0® C.), the supercooled liquid is deemed to be converted into a solid phase. When the supercooled liquid is converted into the solid phase by external force, when the means for supplying energy to maintain the supercooled state has an error, when energy supply is stopped due to power failure, or when the refrigerator is abnormally operated, supercooling release may occurs.

In another aspect of the present invention, the refrigerator includes an energy generator for supplying energy to the supercooled liquid to maintain the supercooled state.

In another aspect of the present invention, the refrigerator includes a casing installed at the door, the storing tank being disposed in the casing.

In another aspect of the present invention, the casing includes at least one of the heater, the sensor and an electrode for supplying energy to the supercooled liquid.

In another aspect of the present invention, the refrigerator includes a passage connected from the storing tank to the outside of the door. By this configuration, the present invention can be applied to a dispenser structure of a general refrigerator.

In another aspect of the present invention, the refrigerator includes a restricting member disposed at the storing tank, for interrupting the motion of the supercooled liquid. This configuration serves to prevent release of the supercooled state by an external impact.

According to yet another aspect of the present invention, there is provided a refrigerator, including: a storing chamber for supplying cool air; a door for opening and closing the storing chamber; a storing tank disposed at a door side, for storing a supercooled liquid; and a restricting member disposed at the storing tank, for interrupting the motion of the supercooled liquid. This configuration prevents release of the supercooled state by an impact of door opening and closing.

In another aspect of the present invention, the restricting member divides the supercooled liquid in the storing tank into a plurality of sections. This configuration restricts the motion of the whole supercooled liquid, and prevents release of the supercooled state by surface tension of the plurality of sections.

In another aspect of the present invention, the restricting member includes at least one plate for interrupting the motion of the supercooled liquid. Here, the plate is not necessarily flat.

In another aspect of the present invention, the restricting member is means for applying pressure to interrupt the motion of the supercooled liquid.

In another aspect of the present invention, the refrigerator includes a heater for applying heat to the storing tank. By this configuration, the supercooling-released liquid can be restored to the liquid phase.

In another aspect of the present invention, the refrigerator includes a passage connected from the storing tank to the outside of the door.

In another aspect of the present invention, the refrigerator includes an energy generator for supplying energy to the supercooled liquid to maintain the supercooled state.

The liquid needs not to be water. Energy can be supplied to the liquid or the supercooled liquid in the form of an electric field or a magnetic field. However, energy can be supplied in various types (for example, ultrasonic waves, magnetrons, etc.) so far as it maintains the liquid phase below the phase transition temperature of the liquid. It must be recognized that the present invention includes these types of energy.

According to yet another aspect of the present invention, there is provided a method of operating a refrigerator, including: a first step for maintaining a liquid in a supercooled state to prevent freezing; a second step for sensing freezing of the liquid; and a third step for releasing freezing of the liquid by using a heater.

In another aspect of the present invention, in the first step, freezing of the liquid is prevented by supplying cool air and energy.

In another aspect of the present invention, a quantity of supplied energy is varied according to a quantity of supplied cool air.

In another aspect of the present invention, in the first step, freezing of the liquid is prevented by restricting the motion of the liquid as well as supplying cool air and energy.

Advantageous Effects

In accordance with the present invention, the refrigerator and the method of operating a refrigerator can generate the supercooled liquid, prevent and restrict freezing of the liquid or supercooled liquid, and release freezing of the supercooled liquid.

In accordance with the present invention, the refrigerator and the method of operating a refrigerator can prevent freezing of water in the dispenser without using the heater.

In accordance with the present invention, the refrigerator and the method of operating a refrigerator can prevent freezing of water in the dispenser by lowering the phase transition temperature of water.

In accordance with the present invention, the refrigerator and the method of operating a refrigerator can restore supercooling release of the supercooled liquid.

In accordance with the present invention, the refrigerator and the method of operating a refrigerator can sense and restore supercooling release of the supercooled liquid.

In accordance with the present invention, the refrigerator and the method of operating a refrigerator can prevent supercooling release of the supercooled liquid.

In accordance with the present invention, the refrigerator and the method of operating a refrigerator can prevent supercooling release of the supercooled liquid by restricting the motion of the supercooled liquid.

In accordance with the present invention, the refrigerator and the method of operating a refrigerator can generate the supercooled liquid and make the slush from the supercooled liquid.

In accordance with the present invention, the refrigerator and the method of operating a refrigerator can make the supercooled liquid or slush by including the supercooling release restoring means or the supercooling release preventing means.

In accordance with the present invention, the refrigerator and the method of operating a refrigerator can control the state of the supercooled liquid, maintain the state of the supercooled liquid, and make the slush.

BRIEF DESCRIPTION OF THE DRAWINGS

FIG. 1 is a structure view illustrating a refrigerator including a dispenser disclosed under Korea Laid-Open Patent Official Gazette 2001-0107286;

FIG. 2 is a structure view illustrating a refrigerator including a dispenser disclosed under Korea Laid-Open Patent Official Gazette 2003-0050929;

FIG. 3 is a structure view illustrating another example of the refrigerator including the dispenser;

FIGS. 4 and 5 are structure views illustrating a dispenser of a refrigerator disclosed under Korea Laid-Open Patent Official Gazette 2005-0051977;

FIGS. 6 and 7 are structure views illustrating a dispenser of a refrigerator disclosed under Korea Laid-Open Patent Official Gazette 2005-0051972;

FIG. 8 is a concept view illustrating supercooled liquid or slush making in accordance with the present invention;

FIG. 9 is a graph showing one example of an experiment result in accordance with the present invention;

FIG. 10 is a structure view illustrating a refrigerator in accordance with one embodiment of the present invention;

FIG. 11 is a structure view illustrating a refrigerator in accordance with another embodiment of the present invention;

FIG. 12 is a structure view illustrating a refrigerator in accordance with yet another embodiment of the present invention;

FIG. 13 is a structure view illustrating a refrigerator in accordance with yet another embodiment of the present invention;

FIG. 14 is a block diagram illustrating a method of operating an apparatus for making a supercooled liquid or slush in accordance with the present invention;

FIGS. 15 to 17 are exemplary views illustrating configuration of electric field applied regions;

FIG. 18 is a structure view illustrating a refrigerator including a supercooling preventing means in accordance with the present invention;

FIG. 19 is a block diagram illustrating a method of operating the refrigerator of FIG. 18;

FIG. 20 is a structure view illustrating one example of a refrigerator including a supercooling releasing means in accordance with the present invention;

FIG. 21 is a block diagram illustrating a method of operating the refrigerator including the supercooling releasing means in accordance with the present invention;

FIG. 22 is a structure view illustrating another example of the refrigerator including the supercooling releasing means in accordance with the present invention;

FIGS. 23 to 25 are structure views illustrating examples of a restricting member in accordance with the present invention; and FIG. 26 is a graph showing another example of the experiment result in accordance with the present invention.

MODE FOR THE INVENTION

A refrigerator and a method of operating the refrigerator in accordance with the present invention will now be described in detail with reference to the accompanying drawings.

First, a method of making a supercooled liquid or slush in accordance with the present invention will now be explained.

FIG. 8 is a concept view illustrating supercooled liquid or slush making in accordance with the present invention. Referring to FIG. 8, a liquid 41 which is a supercooling object is disposed between electrodes 40. In a state where cool air 42 is supplied, an electric field is applied to the liquid 41 by using an AC power source 43. Therefore, the liquid 41 is not frozen but supercooled below its phase transition temperature (for example, water at 0° C. under 1 atm pressure). It is known that supply of energy such as an electric field interrupts hydrogen boning of water consisting of oxygen and hydrogen, and thus water is not frozen. When an external force is applied to the supercooled liquid by a phase converter 44, for example, when an electric force is applied to the supercooled liquid by an electric igniter, the supercooled state maintained by the energy which is being applied to the supercooled liquid or the energy which has been applied to the supercooled liquid qt means that the supercooled state can be maintained although energy supply is interrupted after a predetermined time) is disturbed by the force. Accordingly, freezing ores are formed, and the supercooled liquid is rapidly converted into a solid phase, thereby resulting in slush. Here, a temperature of the supercooled liquid is changed from a supercooled state temperature to a phase transition temperature. The slush state after phase transition is influenced by the temperature of the supercooled liquid before phase transition (the temperature of the supercooled state). If the temperature of the supercooled state is low (approximate to the phase transition temperature), the amount of ice in the slush becomes relatively small (soft slush). Such a difference influences the taste of the user and the use of the slush. The temperature of the supercooled state can be controlled by adjusting the temperature and quantity of the cool air supplied to the supercooled liquid. In case the temperature and quantity of the cool air are constant, the temperature of the supercooled liquid can be controlled by adjusting the quantity of the supplied energy (explained below with reference to FIG. 9). The intensity of the electric field supplied to the supercooled liquid by the AC power source 43 through the electrodes 40 or the quantity of the energy can be regulated by a regulator 45. The intensity of the electric field can be controlled by adjusting a supplied current or voltage.

The experiment result of the present invention will now be explained.

1. Installation of Electrodes and Container

Two electrodes having width and length of 100 mm were installed at an interval CC 200 mm. A container containing 1 L of water was positioned between the two electrodes at a predetermined interval.

2. Supercooling

The above apparatus was put in a refrigerator having a temperature of −6.8° C., and an electric field of 40 kHz and 2 kV was applied thereto. As soon as the apparatus was put into the refrigerator, the electric field was applied to the apparatus. After sufficient supercooling, the supercooled liquid was converted into a solid phase by using an electric igniter for 1500V electric lighter. The result was shown in FIG. 26.

FIG. 9 is a graph showing one example of the experiment result, especially, correlation between the applied power and the temperature of the supercooled liquid. As shown in FIG. 9, the applied power and the temperature of the supercooled liquid show almost linear proportion. It means that, in the given ambient temperature, the set temperature of the supercooled liquid can be controlled by adjusting power applied from an energy generator.

FIG. 10 is a structure view illustrating a refrigerator in accordance with one embodiment of the present invention. The refrigerator 60 includes a freezing chamber 61 and a refrigerating chamber 62. A freezing chamber door 61a is formed on the freezing chamber 61, and a refrigerating chamber door 62b is formed on the refrigerating chamber 62. A passage 63 supplied with water from an external source is formed at the freezing chamber 61. An energy generator or an electric field applied region 64 is formed on the passage 63. An outlet 63a for discharging water is formed at one end of the passage 63. In addition, a valve 63b for controlling water supply from an external water supply source (not shown) to the electric field applied region 64 is formed at the other end of the passage 63. The outlet 63a is linked to an outlet unit 65 formed on the freezing chamber door 61a, and an operating lever 66 for opening and closing the outlet 63a is formed in the outlet unit 65. An electric igniter 67 which is a phase converter is installed between the outlet 63a and the electric field applied region 64. Here, cool air is generated by a refrigerating cycle 68 disposed at the lower portion of the refrigerator 60, and supplied to the freezing chamber 61 through a discharge hole 68a connected to the refrigerating cycle 68. The cool air can be supplied through refrigerant tubes (not shown) formed to surround the freezing chamber 61.

A method of operating the refrigerator in accordance with the present invention will now be explained with reference to FIG. 14.

When the valve 63b is opened, water is supplied from the external water supply source (not shown) to the passage 63. The water exchanges heat with the cool air of the freezing chamber 61 and is supercooled without phase transition by the electric field type energy in the energy generator or the electric field applied region 64. When the user presses the operating lever 66 by using a cup (not shown), the supercooled water is discharged through the outlet 63a. When the supercooled water is discharged, the supercooled water is phase-transited by the operation of the electric igniter 67. The supercooled water contained in the cup is converted into a solid phase, thereby making slush. This operation is controlled by a control unit of the refrigerator which controls the refrigerating cycle 68.

FIG. 11 is a structure view illustrating a refrigerator in accordance with another embodiment of the present invention. Differently from the refrigerator of FIG. 6, the refrigerator 70 further includes a general ice maker 79. The refrigerator 70 includes a freezing chamber 71 and a refrigerating chamber 72. A freezing chamber door 71a is formed on the freezing chamber 71, and a refrigerating chamber door 72b is formed on the refrigerating chamber 72. A passage 73 supplied with water from an external source is formed at the freezing chamber 71. An energy generator or an electric field applied region 74 is formed on the passage 73. An outlet 73a for discharging water is formed at the end of the passage 73. In addition, a valve 73b for controlling water supply from an external water supply source (not shown) to the passage 73, and a valve 73c for controlling water supply to the electric field applied region 74 and the ice maker 79 are formed on the passage 73. The outlet 73a is linked to an outlet unit 75 formed on the freezing chamber door 71a, and buttons 75a, 75b and 75c for selecting discharge of ice, supercooled liquid or slush are formed at the upper portion of the outlet unit 75. A support 75d is formed at the lower portion of the outlet unit 75, and a cup 75e is positioned on the support 75d. An electric igniter 77 which is a phase converter is installed between the outlet 73a and the electric field applied region 74. Here, cool air is generated by a refrigerating cycle 78 disposed at the lower portion of the refrigerator 70, and supplied to the freezing chamber 71 through a discharge hole 78a connected to the refrigerating cycle 78. The cool air can be supplied through refrigerant tubes (not shown) formed to surround the freezing chamber 71.

A method of operating the refrigerator in accordance with the present invention will now be explained with reference to FIG. 14.

When the valve 73b is opened, water is supplied from the external water supply source (not shown) to the passage 73. The water is supplied to the energy generator or the electric field applied region 74 and the ice maker 79 by the operation of the valve 73c. The water is iced in the ice maker 79 by the cool air of the freezing chamber 71, and supercooled without phase transition by the electric field type energy in the electric field applied region 74. When the user puts the cup 75e on the support 75d and selects one of the buttons 75a, 75b and 75c, the ice, supercooled liquid or slush is supplied to the cup 75e through the outlet unit 75. If the user operates the phase converter or the electric igniter 77, the slush is provided, and if not, the supercooled liquid is provided. One may think that, while the supercooled liquid is supplied to the cup 75e through the passage 73, freezing ores are formed and the supercooled liquid is converted into the slush. However, in accordance with the present invention, although the supercooled liquid made by using the energy generator is supplied from the energy generator to another container, the supercooled liquid is not converted into the slush according to its generation condition. That is, the phase converter serves to facilitate slush making and generate freezing ores for slush making. Instead of installing the phase converter on the passage 73, it is possible to position a support 73e to form freezing cores by potential energy of the supercooled liquid discharged from the outlet 73a (for example, 20 cm, variable by the supercooling condition). This operation is controlled by a control unit of the refrigerator 70.

FIG. 12 is a structure view illustrating a refrigerator in accordance with yet another embodiment of the present invention. The refrigerator 80 includes a water tank 81 in an electric field applied region. Except that energy is supplied to the water tank 81 by using electrodes 82, the refrigerator 80 is identical to the refrigerator of FIG. 6. As compared with the case in that energy is applied directly to the supercooled water on the passage, supercooled water is stably generated and supplied (refer to FIG. 14).

FIG. 13 is a structure view illustrating a refrigerator in accordance with yet another embodiment of the present invention. Except that an electric field applied region 94 is formed in a refrigerating chamber door 92a, the refrigerator 90 is identical to the refrigerator of FIG. 6. In this case, a discharge hole 92c positioned adjacent to the electric field applied region 94, for supplying cool air supplied from a freezing chamber side 91 through a damper 92b to the electric field applied region 94 can be formed to lower a temperature of water below a phase transition temperature (refer to FIG. 14). By this configuration, the present invention can be applied to a refrigerator including a dispenser in a refrigerating chamber. In this case, the electric field applied region is preferably formed in the refrigerating chamber side. If the electric field applied region is positioned in the freezing chamber side, the passage of the supercooled water is lengthened. This long passage can make it difficult to control the supercooled water and slush.

FIGS. 15 to 17 are exemplary views illustrating configuration of electric field applied regions. In FIG. 15, a passage 2 passes through an electric field applied region 1, and electrodes 3a are formed outside the passage 2. In FIG. 16, a passage 2 passes through an electric field applied region 1, and electrodes 3b are formed in a hose forming the passage 2. In FIG. 17, an electric field applied region 1 is formed on a passage 2, a water tank 4 is formed in the region 1, and electrodes 3c are formed at the side of the water tank 4. Preferably, the electric field applied region is made of an electric insulator.

FIG. 18 is a structure view illustrating a refrigerator including a supercooling preventing means in accordance with the present invention. The refrigerator 50 includes a freezing chamber 51 and a freezing chamber door 52 for opening and closing the freezing chamber 51. The freezing chamber door 52 is filled with an insulator 53. A passage 54 is formed at the freezing chamber door 52 and connected to an external water supply source. A valve 55 for controlling inflow of water, a water tank 56 for containing water and exchanging heat with the freezing chamber 51, electrodes 57 for lowering a phase transition temperature of the water tank 56, a temperature sensor 58 for sensing a temperature of the water tank 56, and an outlet 54a for discharging water are formed on the passage 54. The outlet 54a is opened when the user presses an operating lever 59.

A method of operating the refrigerator of FIG. 18 will now be described with reference to FIG. 19.

When the valve 55 is opened, water is supplied from the external water supply source to the passage 54. Preferably, water is supplied to the water tank 56 by pressure of the external water supply source. The water contained in the water tank 56 is cooled by heat exchange with cool air of the freezing chamber 51. The temperature of the cooled water is sensed by the temperature sensor 58. Although the freezing chamber door 52 is filled with the insulator 53, since an interval between the water tank 56 and the freezing chamber 51 is small, heat exchange can be carried out. It is also possible to remove the insulator in the heat-exchanged region. When the user presses the operating lever 59 by a cup, the outlet 54a is opened to supply the cool water to the cup. When water is contained in the water tank 56 for a long time due to non-use, when the freezing chamber 51 is operated at a very low temperature for a long time, or when the refrigerator 50 is abnormally operated, water of the water tank 56 is frozen and not discharged even if the operating lever 59 is pressed. In accordance with the present invention, electric field type energy is applied to the water tank 56 through the electrodes 57 in order to lower the phase transition temperature. Therefore, in the above cases, water is not frozen. Energy can be always supplied through the electrodes 57, supplied by a command of the user, or supplied when the temperature of water sensed by the temperature sensor 58 reaches about 0° C. This operation is controlled by a control unit for controlling a refrigerating cycle 62 of the refrigerator 50. The refrigerator 50 can further include a heater 63.

FIG. 20 is a structure view illustrating one example of a refrigerator including a supercooling releasing means in accordance with the present invention. The refrigerator 50 includes a freezing chamber 510 and a freezing chamber door 520 for opening and closing the freezing chamber 510. The freezing chamber door 520 is filled with an insulator 530. A passage 540 is formed at the freezing chamber door 520 and connected to an external water supply source. A valve 550 for controlling inflow of water, a water tank 560 for containing water and exchanging heat with the freezing chamber 510, electrodes 570 for applying electric field type energy to maintain water of the water tank 560 in the supercooled state, a temperature sensor 580 for sensing a temperature of the water tank 560, an outlet 540a for discharging water, and a heater 560a for restoring a solid phase into a liquid phase, when supercooling of the water contained in the water tank 560 is released and the supercooled water is converted into the solid phase, are formed on the passage 540. The outlet 540a is opened when the user presses an operating lever 590.

A method of operating the refrigerator in accordance with the present invention will now be described with reference to FIG. 21.

When the valve 550 is opened, water is supplied from the external water supply source to the passage 540. Preferably, water is supplied to the water tank 560 by pressure of the external water supply source. The water contained in the water tank 560 is cooled by heat exchange with cool air of the freezing chamber 510, and maintained in the supercooled state by the electric field type energy supplied by the electrodes 570. Although the freezing chamber door 520 is filled with the insulator 530, since an interval between the water tank 560 and the freezing chamber 510 is small, heat exchange can be carried out. It is also possible to remove the insulator in the heat-exchanged region. When the user presses the operating lever 590 by a cup, the outlet 540a is opened to supply the cool water to the cup. On the other hand, when external force is applied by rough opening or closing of the freezing chamber door 520, when an error occurs in current supply to the electrodes 570, or when the refrigerator 500 is abnormally operated, supercooling of the supercooled liquid is released, and the supercooled liquid is converted into the solid phase. When supercooling is released, the supercooled liquid is converted into slush, and the temperature of the slush is changed to the phase transition temperature (for example, 0° C. in 1 atm pressure). The temperature is sensed by the temperature sensor 580 and transmitted to a control unit for controlling a refrigerating cycle 500a. Accordingly, the control unit restores the slush into the liquid state by operating the heater 560a, and supercools water by operating the electrodes 570. If necessary, the control unit can operate the heater 560a not to restore the slush into the liquid state but to prevent freezing of the slush. It is because the slush can be discharged through the passage 540.

FIG. 22 is a structure view illustrating another example of the refrigerator including the supercooling releasing means in accordance with the present invention. The refrigerator 700 includes a freezing chamber 710 and a freezing chamber door 720 for opening and closing the freezing chamber 710. A casing 760a is formed inside the freezing chamber door 720. A water tank 760 is disposed in the casing 760a. A heater 760a, electrodes 770 and a temperature sensor 780 are formed in the casing 760a. The water tank 760 can be connected or not connected to an external water supply source. If the water tank 760 is not connected to the external water supply source, a valve (not shown) is necessary to link water to an outlet 740a of a passage 740 when the water tank 760 is disposed at the casing 760a. On the other hand, a cool air duct 790 for supplying cool air to the water tank 760 can be installed in the freezing chamber 710.

FIGS. 23 to 25 are structure views illustrating examples of the restricting member in accordance with the present invention. The restricting member of FIG. 23 is made by forming a plurality of sections 910 in a water tank 900. The plurality of sections 910 serve to restrict the motion of the whole supercooled liquid, and prevent releasing of the supercooled state by using surface tension to the supercooled liquid. The lower portions of the plurality of sections 910 do not contact the bottom of the water tank 900, so that the supercooled liquid can be linked together in the water tank 900. The restricting member of FIG. 24 is made by forming plates 920 for interrupting the motion of the supercooled liquid in the water tank 900. The restricting member of FIG. 25 is made by forming a mass member 930 for applying pressure to interrupt the motion of the supercooled liquid in the water tank 900.

The invention claimed is:

1. A refrigerator, comprising:
a liquid;
cool air supplied to supercool the liquid; and
a preventing means for preventing the liquid from existing as a solid phase,
wherein the preventing means is at least one of an energy generator for supplying energy to the liquid which can lower the phase transition temperature of the liquid to maintain the liquid in the supercooled state, a restricting member for interrupting the motion of the liquid, and a heater for converting the solid phase into the liquid.

2. The refrigerator of claim 1, wherein the preventing means is at least one of a heater for applying heat to the liquid, and a restricting means for interrupting the motion of the liquid.

3. The refrigerator of claim 2, further comprising a sensor for sensing a state variation of the liquid and cooperating with the heater.

4. The refrigerator of claim 1, further comprising a door having an outlet for the liquid.

5. A refrigerator, comprising:
a storing chamber for supplying cool air;
a door for opening and closing the storing chamber;
a passage being disposed at the door and having an outlet for discharging water, a temperature of water in the passage being lowered by the cool air of the storing chamber; and
an energy generator disposed on the passage, for supplying energy which can lower the phase transition temperature of water so as to supercool water,
wherein the energy generator comprises an electrode for forming an electric field.

6. The refrigerator of claim 5, comprising a water tank disposed on the passage, wherein the energy generator supplies energy to the water tank.

7. The refrigerator of claim 5, wherein the energy generator has a shape to cover a part of the passage.

8. The refrigerator of claim 5, wherein the passage is covered with an insulator inside the door.

9. The refrigerator of claim 5, wherein the storing chamber is a freezing chamber.

10. The refrigerator of claim 5, wherein the opposite side to the outlet of the passage is connected to an external water supply source, and, on the passage, water is supplied from the lower portion of the energy generator and discharged through the outlet disposed at the upper portion of the energy generator.

11. A refrigerator, comprising:
a storing chamber for supplying cool air;
a door for opening and closing the storing chamber;
a storing tank disposed at the door side for storing a supercooled liquid;
an energy generator for supplying energy which can lower the phase transition temperature of the supercooled liquid to maintain a supercooled state;
a sensor for sensing a state variation of the supercooled liquid; and a heater for supplying heat to the storing tank and cooperating with the sensor, wherein the heater supplies heat to the storing tank when the sensor sensing freezing of the supercooled liquid.

12. The refrigerator of claim 11, comprising a casing installed at the door, the storing tank being disposed in the casing.

13. The refrigerator of claim 12, wherein the casing comprises at least one of the heater, the sensor and an electrode for supplying energy to the supercooled liquid.

14. The refrigerator of claim 11, comprising a passage connected from the storing tank to the outside of the door.

15. The refrigerator of claim 11, comprising a restricting member disposed at the storing tank, for interrupting the motion of the supercooled liquid.

16. A refrigerator, comprising:
a storing chamber for supplying cool air;
a door for opening and closing the storing chamber;
a storing tank disposed at a door side, for storing a supercooled liquid; and
a restricting member disposed at the storing tank, for interrupting the motion of the supercooled liquid,
wherein the restricting member divides the supercooled liquid in the storing tank into a plurality of sections.

17. The refrigerator of claim 16, wherein the restricting member comprises at least one plate for interrupting the motion of the supercooled liquid.

18. The refrigerator of claim 16, wherein the restricting member is means for applying pressure to interrupt the motion of the supercooled liquid.

19. The refrigerator of claim 16, comprising a heater for applying heat to the storing tank.

20. The refrigerator of claim 16, comprising a passage connected from the storing tank to the outside of the door.

21. The refrigerator of claim 16, comprising an energy generator for supplying energy to the supercooled liquid to maintain the supercooled state.

22. A method of operating a refrigerator, comprising:
a first step for maintaining a liquid in a supercooled state to prevent freezing;
a second step for sensing freezing of the liquid; and
a third step for releasing freezing of the liquid by using a heater,
wherein, in the first step, freezing of the liquid is prevented by restricting the motion of the liquid.

23. The method of claim 22, wherein, in the first step, freezing of the liquid is further prevented by supplying cool air and energy.

24. The method of claim 23, wherein a quantity of supplied energy is varied according to a quantity of supplied cool air.

* * * * *